United States Patent [19]

Smith

[11] 4,086,252

[45] Apr. 25, 1978

[54] PROCESS FOR THE MANUFACTURE OF ANTHRAQUINONE COMPOUNDS

[75] Inventor: Trevor James Smith, Manchester, England

[73] Assignee: Imperial Chemical Industries Limited, London, England

[21] Appl. No.: 740,022

[22] Filed: Nov. 8, 1976

[30] Foreign Application Priority Data

Dec. 10, 1975 United Kingdom ............... 50646/75

[51] Int. Cl.$^2$ ...................... C07C 49/68; C09B 1/515
[52] U.S. Cl. ................................................. 260/376
[58] Field of Search ................... 252/432, 436; 260/376

[56] References Cited

U.S. PATENT DOCUMENTS 2,195,974  4/1940  Reppe et al. ...................... 260/376 X
2,876,241  3/1959  Koch et al. ...................... 252/432 X

FOREIGN PATENT DOCUMENTS 1,205,501  2/1960  France ............................... 260/376

OTHER PUBLICATIONS

Kapczynski, J. et al., "Stabilized Sulfur Trioxide" in Chem. Abs., vol. 54, 15860d., 8/1960.

*Primary Examiner*—Allen B. Curtis
*Attorney, Agent, or Firm*—Cushman, Darby & Cushman

[57] ABSTRACT

Process for the production of α-(carboxyethylamino)anthraquinones by reacting an α-aminoanthraquinone with an alkenyl carboxylic acid in sulphuric acid medium containing boric acid, metaboric acid or boric oxide.

8 Claims, No Drawings

PROCESS FOR THE MANUFACTURE OF ANTHRAQUINONE COMPOUNDS

This invention relates to an improved process for the manufacture of α-(carboxyalkylamino)anthraquinones.

British Specification No. 841927 describes a process for the manufacture of α-(β'-carboxyethylamino)anthraquinones by reacting α-aminoanthraquinones with acrylic acid in sulphuric acid medium. However this process suffers from the disadvantage that sulphonated products are simultaneously produced so that it is difficult to obtain the required compounds in high yields and purity. It has now been found that these disadvantages can be overcome by carrying out the reaction in the presence of boric acid.

According to the invention there is provided an improved process for the production of anthraquinone compounds which contain from 1 to 4

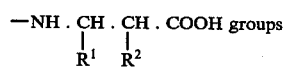

each of which is attached to a carbon atom in an α-position on the anthraquinone nucleus, wherein one of $R^1$ and $R^2$ is hydrogen, methyl or ethyl, and the other of $R^1$ and $R^2$ is hydrogen, which comprises reacting an anthraquinone compound containing from 1 to 4 primary amino groups each of which is attached to a carbon atom in an α-position on the anthraquinone nucleus with an alkenyl carboxylic acid of the formula

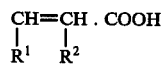

wherein $R^1$ and $R^2$ have the meaning stated, in sulphuric acid containing not more than 50% by weight of water, and in the presence of 10 to 100% by weight based on the weight of the aminoanthraquinone of boric acid, meta boric acid or boric oxide, at a temperature between 20° and 130° C.

As examples of the said alkenyl carboxylic acids there may be mentioned α-methylacrylic acid, α-ethylacrylic acid, β-methylacrylic acid and, preferably, acrylic acid in which case $R^1$ and $R^2$ both represent hydrogen atoms. At least one molecular proportion of the alkenylcarboxylic acid must be used for each amino group present in the aminoanthraquinone used as starting material, but it is preferred to use between one and three molecular proportions of the alkenyl carboxylic acid for each amino group present.

Although from 10 to 100% by weight of boric acid, metaboric acid or boric oxide based on the weights of the aminoanthraquinone may be used, for optimum yield and quality of product it is preferred to use one molecular proportion of boric acid, metabroic acid or boric oxide for each amino group in the aminoanthraquinone.

The process of the invention can be conveniently carried out by, for example, adding the alkenyl carboxylic acid to the sulphuric acid containing the aminoanthraquinone and the boric acid, metaboric acid or boric oxide, and stirring the reaction mixture at a temperature between 20° and 130° C, preferably between 40° and 100° C, until the reaction is complete. This usually requires several hours. The reaction mixture is then poured into water, optionally containing ice, and the precipitated solid being the required anthraquinone compound containing a

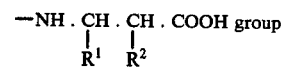

or groups is isolated in conventional manner.

The anthraquinone compounds containing primary amino groups used as starting materials in the process of the invention can additionally contain further substituents other than sulphonic acid groups, for example hydroxy, chlorine, bromine, methyl, methoxy, β-methoxyethoxy, cyano, carboximide, nitro, aryl, arylamino, alkylamino, cycloalkylamino, dialkylamino, alkylthio and arylthio. As specific examples of such anthraquinone compounds there may be mentioned 1-aminoanthraquinone, 1:4-, 1:5- or 1:8-diaminoanthraquinone, 1:4:5-triaminoanthraquinone, 1:4:5:8-tetraaminoanthraquinone, 1-amino-4-hydroxyanthraquinone, 1:5-diamino 4:8-dihydroxyanthraquinone, 1:8-diamino-4:5-dihydroxyanthraquinone, 1-amino-2-(methyl- or methoxy)-anthraquinone, 1-amino-2-(bromo-, cyano-, nitro- or methyl-)-4-hydroxyanthraquinone, 1:4-diamino-2-(bromo-, cyano-, methylthio-, n-butylthio-, phenylthio, or methoxy-)anthraquinone, 1-amino-4-anilinoanthraquinone, 1:4-diamino-6:7-dichloroanthraquinone, 1:5-diamino-4-hydroxy-8-anilinoanthraquinone, 1:5-diamino-4:8-dihydroxy-2-(4'-hydroxyphenyl)anthraquinone, 1-amino-4,5-dihydroxy-8-nitroanthraquinone, and 1-amino-4:8-dihydroxy-5-nitroanthraquinone.

Preferred aminoanthraquinones for use in the process of the invention are 1:5-diamino-4:8-dihydroxyanthraquinone and 1:8-diamino-4:5-dihydroxyanthraquinone.

Although the sulphuric acid used in the process contains not more than 50% by weight of water, it preferably contains less than 20% by weight of water, that is to say the sulphuric acid has a strength of between 80% and 100%.

The anthraquinone compounds containing from 1 to 4

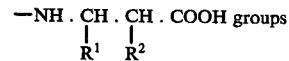

are of value as intermediates in the production of disperse anthraquinone dyestuffs valuable for colouring synthetic textile materials. Thus, for example, the said compounds can be converted to the corresponding esters by reaction with an alcohol in the presence of sulphuric acid.

The invention is illustrated but not limited by the following Examples in which the parts and percentages are by weight.

EXAMPLE 1

18 Parts of acrylic acid are added over 1 hour to a mixture of 13.5 parts of 1:5-diamino-4:8-dihydroxyanthraquinone, 3.1 parts of boric acid and 93 parts of 92% sulphuric acid at a temperature of 50° – 55° C, and the resulting mixture is then stirred for 16 hours at 80° – 85° C. The reaction mixture is cooled, poured into 400 parts of ice/water, and the precipitated solid is filtered off, washed with water and dried. The yield of the 1:5-di(β- carboxyethylamino)4:8-dihydroxyanthraquinone is 18 parts (87%).

EXAMPLE 2

18 Parts of acrylic acid are gradually added to a mixture of 13.5 parts of 1:8-diamino-4:5-dihydroxyanthraquinone, 6.2 parts of boric acid and 100 parts of 90% sulphuric acid at 20°–25° C, and the mixture is then stirred for 10 hours at 100° C. The reaction mixture is then processed as described in Example 1 to give 18 parts (87%) of 1:8-di($\beta$-carboxyethylamino)-4:5-dihydroxyanthraquinone.

EXAMPLE 3

15 Parts of acrylic acid are gradually added to a mixture of 22.3 parts of 1-aminoanthraquinone, 6.2 parts of boric acid and 120 parts of 100% sulphuric acid at 30°–35° C, and the mixture is then stirred for 12 hours at 90° – 95° C. The reaction mixture is then processed as described in Example 1 to give 27 parts (91.5%) of 1-($\beta$-carboxyethylamino)anthraquinone.

EXAMPLE 4

The procedure described in Example 1 is repeated except that there are used 93 parts of 50% sulphuric acid and the mixture is stirred for 18 hours at 80° C. 17 Parts of 1:5-di($\beta$-carboxyethylamino)-4:8-dihydroxyanthraquinone are obtained.

EXAMPLE 5

72 Parts of acrylic acid are added over 1 hour to a mixture of 67.5 parts of 1:5-diamino-4:8-dihydroxyanthraquinone, 31 parts of boric acid and 460 parts of 96% sulphuric acid at 50°–60° C, and the mixture is then stirred for 6 hours at 80°–85° C. The mixture is poured into 1500 parts of water at 80° C, and, after cooling to 40° C, the precipitated solid is filtered off, washed with water and dried. 98 Parts (94%) of 1:5-di($\beta$-carboxyethylamino)-4:8-dihydroxyanthraquinone are obtained.

Similar results are obtained when the 31 parts of boric acid used in this Example are replaced by 22 parts of meta boric acid or by 35 parts of boric oxide.

EXAMPLE 6

22 Parts of $\alpha$-methacrylic acid are gradually added to a mixture of 23.9 parts of 1-amino-4-hydroxyanthraquinone, 6.2 parts of boric acid and 150 parts of 90% sulphuric acid at 35°–40° C, and the mixture is then stirred for 16 hours at 85°–90° C. The reaction mixture is processed as previously described to give 31 parts (94%) of 1-($\beta$-carboxypropylamino)-4-hydroxyanthraquinone.

EXAMPLE 7

18 Parts of acrylic acid are added over 2 hours to a mixture of 13.5 parts of 1:5-diamino-4:8-dihydroxyanthraquinone, 6.2 parts of boric acid and 93 parts of 92% sulphuric acid at 50°–60° C, and the mixture is then stirred for 6 hours at 80°–85° C. Analysis of the reaction mixture shows that the yield of 1:5-di($\beta$-carboxyethylamino)-4:8-dihydroxyanthraquinone is approximately 95%, whilst there is approximately 5% of sulphonated anthraquinone compounds. This sulphonated material is however removed from the required 1:5-di($\beta$-carboxyethylamino)-4:8-dihydroxyanthraquinone when the reaction mixture is processed as described in Example 1. In contrast when the 6.2 parts of boric acid are omitted the reaction mixture (at the conclusion of the 6 hours heating) is found to contain only some 20% of the required material and approximately 80% of sulphonated anthraquinone compounds, and it is very difficult to isolate the required material without any of the sulphonated compounds.

EXAMPLE 8

18 Parts of acrylic acid are gradually added to a mixture of 13.5 parts of 1:5-diamino-4:8-dihydroxyanthraquinone, 6.2 parts of boric acid and 93 parts of 96% sulphuric acid at 25°–30° C, and the mixture is then stirred for 16 hours at 40°–45° C. The reaction mixture is poured into 400 parts of ice/water, sodium carbonate added to give a pH of 4, and the precipitated solid is filtered off, washed with water and dried. 18 Parts of 1:5-di($\beta$-carboxyethylamino)-4:8-dihydroxyanthraquinone are obtained.

EXAMPLE 9

36 Parts of acrylic acid are gradually added to a mixture of 27 parts of 1:5-diamino-4:8-dihydroxyanthraquinone, 12.5 parts of boric acid and 200 parts of 80% sulphuric acid at 40°–45° C, and the mixture is then stirred for 8 hours at 70°–75° C. When the reaction mixture is processed as described in Example 1, 36 parts of 1:5-di($\beta$-carboxyethylamino)-4:8-dihydroxyanthraquinone are obtained.

EXAMPLE 10

20 Parts of acrylic acid are gradually added to a mixture of 15.8 parts of 1,4-diamino-2,3-dichloroanthraquinone, 3.1 parts of boric acid and 100 parts of 100% sulphuric acid at 25°–30° C, and the mixture is then stirred for 60 hours at 25°–30°. The reaction mixture is then processed as described in Example 1 to give 21 parts (93%) of 1,4-bis($\beta$-carboxyethylamino)-2,3-dichloroanthraquinone.

Further examples of the process are given in the following Table. An anthraquinone compound containing a primary amino group or groups in $\alpha$-position as defined in the second column of the table is reacted with an alkenylcarboxylic acid as defined in the third column of the table, in amount of 2.5 molecular proportions for each amino group in the aminoanthraquinone, reactions being carried out in sulphuric acid of 90 to 100% strength in amount of 6.0 to 7.5 parts per part of aminoanthraquinone at a temperature of 80° to 90° C for 6 to 16 hours, in the presence of 1 molecular proportion of boric acid for each amino group in the aminoanthraquinone.

The products derived from these Examples of the process may be isolated in conventional manner and may be used as intermediates in the preparation of anthraquinone dyestuffs.

| Example | 2-aminoanthraquinone compound | Alkenylcarboxylic acid |
|---|---|---|
| 11 | 2-bromo-1,5-diamino-4,8-dihydroxyanthraquinone | Acrylic acid |
| 12 | 1-amino-4-anilinoanthraquinone | " |
| 13 | 1-amino-4-anilino-2-bromoanthraquinone | " |
| 14 | 1-amino-4-methylaminoanthraquinone | " |
| 15 | 1-amino-4-cyclohexylaminoanthraquinone | " |
| 16 | 1,4-diaminoanthraquinone | " |

-continued

| Example | 2-aminoanthraquinone compound | Alkenylcarboxylic acid |
|---------|-------------------------------|------------------------|
| 17 | 1,5-diaminoanthraquinone | " |
| 18 | 1,8-diaminoanthraquinone | " |
| 19 | 1,4,5-triaminoanthraquinone | " |
| 20 | 1,4,5,8-tetraaminoanthraquinone | " |
| 21 | 1-amino-4-hydroxyanthraquinone | " |
| 22 | 1-amino-2-methylanthraquinone | " |
| 23 | 1-amino-2-methoxyanthraquinone | " |
| 24 | 1-amino-2-bromo-4-hydroxyanthraquinone | " |
| 25 | 1-amino-4-hydroxy-2-nitroanthraquinone | " |
| 26 | 1,4-diamino-5-nitroanthraquinone | " |
| 27 | 1-amino-4-hydroxy-2-methoxyanthraquinone | Acrylic acid |
| 28 | 1-amino-4-hydroxy-2-(2-methoxyethoxy)anthraquinone | " |
| 29 | 1-amino-2-cyano-4-hydroxyanthraquinone | " |
| 30 | 1,4-diamino-2-cyanoanthraquinone | " |
| 31 | 1,4-diamino-2,3-dicyanoanthraquinone | " |
| 32 | 1,4-diaminoanthraquinone-2,3-dicarboxyimide | " |
| 33 | 1,4-diamino-2-bromoanthraquinone | " |
| 34 | 1,4-diamino-2-methoxyanthraquinone | " |
| 35 | 1,4-diamino-5,8-dihydroxyanthraquinone | " |
| 36 | 1,4-diamino-6,7-dichloroanthraquinone | " |
| 37 | 2-bromo-1,8-diamino-4,5-dihydroxyanthraquinone | " |
| 38 | 1,5-diamino-4,8-dihydroxy-2-(4'-hydroxyphenyl)anthraquinone | " |
| 39 | 1,5-diamino-4,8-dihydroxy-2(4'-methoxyphenyl)anthraquinone | " |
| 40 | 1-amino-8-anilino-4,5-dihydroxyanthraquinone | " |
| 41 | 1-amino-5-anilino-4,8-dihydroxyanthraquinone | " |
| 42 | 1,5-diamino-8-anilino-4-hydroxyanthraquinone | " |
| 43 | 1,8-diamino-5-anilino-4-hydroxyanthraquinone | " |
| 44 | 1,5-diamino-4,8-dihydroxyanthraquinone | Acrylic acid |
| 45 | 1,8-diamino-4,5-dihydroxyanthraquinone | α-Methylacrylic acid |
| 46 | 1,5-diamino-4,8-dihydroxyanthraquinone | β-Methylacrylic acid |
| 47 | 1,5-diamino-4,8-dihydroxyanthraquinone | α-Ethylacrylic acid |
| 48 | 1-amino-4,8-dihydroxy-5-nitroanthraquinone | Acrylic aid |
| 49 | 1-amino-4-p-toluidinoanthraquinone | " |
| 50 | 1-amino-4-p-anisidinoanthraquinone | " |
| 51 | 1-amino-4,5-dihydroxy-8-nitroanthraquinone | " |
| 52 | 1,4-diamino-2-n-butylthioanthraquinone | " |
| 53 | 1,4-diamino-2-phenylthioanthraquinone | " |
| 54 | 1-amino-2-ethylthio-4-hydroxyanthraquinone | " |
| 55 | 1,4-diamino-2-methylthioanthraquinone | " |

We claim:

1. A process for the production of anthraquinone compounds which contain from 1 to 4

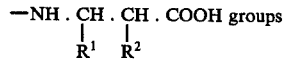

each of which is attached to a carbon atom in an α-position on the anthraquinone nucleus, wherein one of $R^1$ and $R^2$ is hydrogen, methyl or ethyl, and the other of $R^1$ and $R^2$ is hydrogen, which comprises reacting an anthraquinone compound containing from 1 to 4 primary amino groups each of which is attached to a carbon atom in an α-position on the anthraquinone nucleus with an alkenyl carboxylic acid of the formula

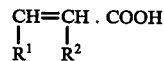

wherein $R^1$ and $R^2$ have the meanings stated, in sulphuric acid containing not more than 50% by weight of water, and in the presence of 10 to 100% be weight, which is an amount sufficient to suppress simultaneous production of sulfonate products, based on the weight of the aminoanthraquinone of boric acid, metaboric acid or boric oxide, at a temperature between 20° and 130° C.

2. A process as claimed in claim 1 wherein $R^1$ and $R^2$ both represent hydrogen atoms.

3. A process as claimed in claim 1 wherein from one to three molecular proportions of the alkenyl carboxylic acid is used for each primary amino group present on the anthraquinone nucleus.

4. A process as claimed in claim 1 wherein the amount of boric acid, metaboric acid or boric oxide used is 1 molecular proportion for each primary amino group in the aminoanthraquinone.

5. A process as claimed in claim 1 wherein the reaction is carried out at a temperature between 40° and 100° C.

6. A process as claimed in claim 1 wherein the sulphuric acid has a strength between 80 and 100% by weight.

7. A process as claimed in claim 1 wherein the aminoanthraquinone compound is 1,5-diamino-4,8-dihydroxyanthraquinone or 1,8-diamino-4,5-dihydroxyanthraquinone.

8. A process as claimed in claim 1 wherein the alkenyl carboxylic acid is added to the sulphuric acid containing the aminoanthraquinone and the boric acid, metaboric acid or boric oxide, the reaction mixture is stirred at a temperature between 20° and 130° C until the reaction is complete, after which it is poured into water, or ice and water, the precipitated anthraquinone compound containing a

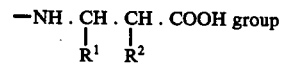

or groups then being isolated in conventional manner.